United States Patent [19]
Kellström

[11] 4,227,754
[45] Oct. 14, 1980

[54] ROLLING BEARING
[75] Inventor: Magnus Kellström, Partille, Sweden
[73] Assignee: SKF Industries, Inc., King of Prussia, Pa.
[21] Appl. No.: 23,625
[22] Filed: Mar. 26, 1979
[30] Foreign Application Priority Data
 Apr. 11, 1978 [SE] Sweden ............................ 7804017
[51] Int. Cl.³ ..................... F16C 19/26; F16C 33/58
[52] U.S. Cl. .................................. 308/177; 308/215; 308/216
[58] Field of Search ............... 308/177, 215, 216, 214, 308/211, 194

[56] References Cited
U.S. PATENT DOCUMENTS

| | | | |
|---|---|---|---|
| 3,337,278 | 8/1967 | Vigh | 308/202 |
| 3,964,806 | 6/1976 | Harrison | 308/235 |
| 4,065,191 | 12/1977 | Kellstrom | 308/214 |

*Primary Examiner*—Lenard A. Footland
*Attorney, Agent, or Firm*—Eugene E. Renz, Jr.

[57] ABSTRACT

A rolling bearing characterized by novel features of construction and arrangement wherein the rotational speed of the rolling bodies all have the same revolution speed under varying load conditions and even if they lie in different load zones or are of different size within reasonable tolerance limits. By this construction, the retainer pockets can be sized to provide small play for the rolling elements to enhance the guiding of the rolling bodies and eliminate undesirable noise. This, of course, eliminates force effects from the retainer for rolling elements which are larger or smaller than the nominal dimension. This is achieved by providing an oscillation ratio $G_i/G_y$ wherein $G_I$ and $G_y$ are the spaces between the envelope surface of the rolling body and the race track in the inner race ring and the outer ring taken along a normal to the rolling body axis located at a distance from the rolling body center of a non-loaded bearing is greater than $$0.5 + 0.5\left[\frac{1+\gamma}{1-\gamma}\right]^{1.5}$$

in which
$\gamma = D_w \cos \alpha/d_m$ and
$D_w$ = the rolling body diameter,
$\alpha$ = the bearing contact angle and
$d_m$ = twice the distance between the rolling body center and the bearing axis.

2 Claims, 1 Drawing Figure

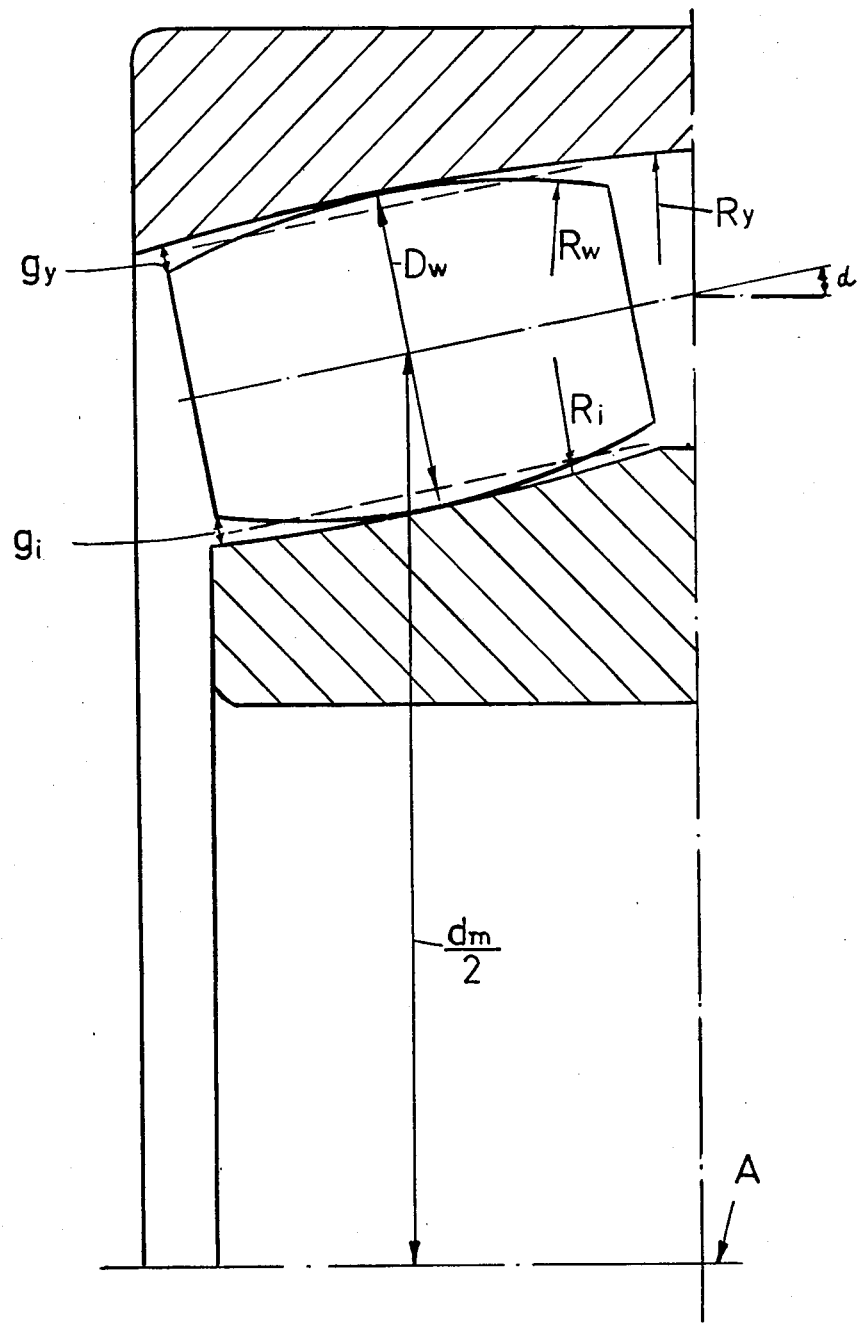

ROLLING BEARING

BACKGROUND OF THE INVENTION

The present invention refers to a rolling bearing according to the preamble of the accompanying claim 1.

In such bearings of conventional design the momentary revolution speed of the rolling bodies varies with the momentary load. For avoiding the rolling bodies and the retainer thereby from influencing each other with large forces, which could cause i.a. a rapid wear and energy losses, it is earlier known to design the retainer in such a manner that the play of the rolling bodies in the retainer pockets will allow the speed of the rolling bodies to vary in differently loaded sections of their revolution path. A large pocket play is however a drawback in other aspects. The ability of the retainer in guiding the rolling bodies is for instance reduced and annoying noises can be generated. It is also known to make retainers in a flexible material for the region around the retainer pockets, whereby the retainer is allowed to be deformed at the contact with the rolling bodies. Such retainers are however complicated to make and their strength and ability of guiding the rolling bodies are oftenly unsatisfactory.

In some cases the revolution speed will vary between different rolling bodies depending upon the fact that the rolling bodies from tolerance reasons are of different size. The smallest rolling bodies, which are always subjected to comparatively light load, must then always be pushed on, and the larger rolling bodies are retarded through their contact with the retainer and this condition is not altered by use of earlier known retainer constructions, which therefore cannot solve the problem in these cases.

The purpose of the present invention is to provide a bearing of the type defined in the preamble, in which the revolution speed of the rolling bodies is not depending on the size of the load on the rolling bodies. This is obtained according to the invention by giving the bearing the features defined in the accompanying claim.

As the revolution speed of the rolling bodies is not depending on their load, all rolling bodies will at each moment have the same revolution speed, also if they lie in different load zones or are of different size within reasonable measure tolerances, which means that the retainer pockets without inconvenience can be dimensioned to give the rolling bodies a small play in the pockets, whereby the ability of the retainer to guide the rolling bodies will be good and the risk for annoying noises is reduced. It is furthermore avoided that the rolling bodies which are bigger or smaller than the nominal dimension will be influenced by forces from the retainer.

SUMMARY OF THE INVENTION

When loading a bearing, wherein the profiles of the race track and rolling bodies are curved, there is, due to the material deformation, which will occur in a bearing under load, achieved a reduction of the distance between the rolling body axis and the effective roll contact in each race track, i.e. that or those points or that line where a true rolling and no sliding occurs. The invention is based on the observation that the revolution speed of the rolling bodies tends to be reduced if the distance between the rolling body axis and the effective rolling contact in the outer race track is reduced faster than the distance between the rolling body axis and the effective rolling contact in the inner race track at increased load, and this will counteract the tendency of increased revolution speed, which rolling bodies in earlier known bearings will get at increased load, when the condition is the opposite or when both mentioned spaces are about equally reduced. It is possible to obtain the above mentioned desirable effect by suitable adaption of the osculation between the rolling bodies and the outer and inner race tracks, respectively. The FIGURE is a longitudinal section through a roller bearing. Theoretical and experimental evaluations have shown that the desired effect is obtained if the osculation ratio $$\frac{1 - \frac{R_w}{R_i}}{1 - \frac{R_w}{R_y}}$$

where
$R_w$ = the radius of curvature of the axial section profiles of the rolling bodies envelope surface
$R_i$ = the radius of curvature of the axial section profile of the inner race track and
$R_y$ = the radius of curvature of the axial section profile of the outer race track,
is of the size $$\left[\frac{1+\gamma}{1-\gamma}\right]^{1.5}$$

where $\gamma = D_w \cos \alpha / d_m$ and
$D_w$ = the diameter of the rolling bodies,
$\alpha$ = the bearing contact angle and $d_m$ = twice the distance between the rolling body centre and the bearing axis. The different symbols have been introduced in the accompanying drawing, which shows an axial section of one half of a double row spherical roller bearing, wherein the differences between the radii of the profiles of the race tracks and the rolling body has been heavily exaggerated for the sake of clarity. The arrows showing the different radii shown only the profiles intended with the symbols and do not define the size of the radii.

The amount $$\left[\frac{1+\gamma}{1-\gamma}\right]^{1.5}$$

is for common types of double row spherical roller bearings nominally about 1,7, whereas the osculation ratio for hitherto known bearings of this type is about 1 and often less than 1, i.e. the radius of curvature of the axial section profile of the inner race track is almost as big as, and often less than the radius of curvature of the axial section profile of the outer race track. The relation $$\frac{1 - \frac{R_w}{R_i}}{1 - \frac{R_w}{R_y}} = \left[\frac{1+\gamma}{1-\gamma}\right]^{1.5}$$

gives optimum conditions at spherical roller bearings having normal dimensions of the diameters of the race tracks and the rollers with normal contact angles, and in which no oblique rolling of the rollers take place in the race tracks. The expression oblique rolling means that the axes of the rollers are not in the same plane as the bearing axis. It is however not possible completely to avoid oblique rolling and it is in fact in certain cases desirable. The optimum osculation ratio is therefore not always exactly equal to the value $$\left[\frac{1+\gamma}{1-\gamma}\right]^{1.5}$$

The optimum osculation ratio has however a value which is greater than $$0.5 + 0.5\left[\frac{1+\gamma}{1-\gamma}\right]^{1.5}$$

for all oblique rolling angles which in practice can occur in bearings having roller and race track diameter dimensions which can occur in practice.

In bearings where the axial section profiles of the race tracks and/or the rolling bodies are curved otherwise than the normal arc-shape, e.g. if the axial section profile of the rolling bodies have an eliptic or other similar form it is not possible to use the above definition for the osculation ratio.

The osculation ratio is then instead generally defined as $g_i/g_y$ where $g_i$ and $g_y$ are the spaces between the envelope surface of the rolling body and the race track of the inner race ring and the outer race ring respectively, taken along a normal to the rolling body axis located at a distance from the rolling body centre in an unloaded bearing. The ratio $g_i/g_y$ is for most possible rolling body and race track profiles almost constant for all normals between the roller body centre and the roller body end, but $g_i$ and $g_y$ are of course preferably measured at the roller body end, where the distances in most cases are greatest. In the drawing $g_i$ and $g_y$ are marked at the roller end. For a bearing according to the invention thus $$\frac{g_i}{g_y} > 0.5 + 0.5\left[\frac{1+\gamma}{1-\gamma}\right]^{1.5}$$

and as a special case for bearings with arc formed race track and rolling body profiles $$\frac{1 - \frac{R_w}{R_i}}{1 - \frac{R_w}{R_y}} > 0.5 + 0.5\left[\frac{1+\gamma}{1-\gamma}\right]^{1.5}$$

What is claimed is:

1. A rolling bearing incorporating outer race ring, inner race ring, race tracks arranged therein and rolling bodies rolling in said race tracks, wherein at least one of the axial section profiles of the race tracks and rolling bodies in the common contact positions between rolling body and race track is curved, so that the bearing osculation ratio $g_i/g_y$ wherein $g_i$ and $g_y$ are the spaces between the envelope surface of the rolling body and the race track of the inner race ring and the outer race ring respectively taken along a normal to the rolling body axis located at a distance from the rolling body centre of a non-loaded bearing, is greater than $$0.5 + 0.5\left[\frac{1+\gamma}{1-\gamma}\right]^{1.5}$$

in which
$\gamma = D_w \cos \alpha / d_m$ and
$D_w =$ the rolling body diameter,
$\alpha =$ the bearing contact angle and
$d_m =$ twice the distance between the rolling body centre and the bearing axis.

2. A rolling bearing according to claim 1, incorporating race tracks and rolling bodies having arc-shaped axial section profiles, characterized thereby, that the bearing osculation ratio $$\frac{1 - \frac{R_w}{R_i}}{1 - \frac{R_w}{R_y}}$$

wherein
$R_w =$ the radius of curvature of the axial section of the rolling body envelope surface
$R_i =$ the radius of curvature of the axial section profile of the inner race track and
$R_y =$ the radius of curvature of the axial section profile of the outer race track, is greater than $$0.5 + 0.5\left[\frac{1+\gamma}{1-\gamma}\right]^{1.5}$$

* * * * *